US008823513B2

(12) United States Patent
Jameson et al.

(10) Patent No.: US 8,823,513 B2
(45) Date of Patent: Sep. 2, 2014

(54) SYSTEMS AND METHODS TO TRACK MOVEMENT OF ANIMALS

(75) Inventors: Jimmy Jameson, Seymour, TN (US);
Chris Morgan, Knoxville, TN (US);
Jason Edwards, Knoxville, TN (US);
Aaron Russell, Knoxville, TN (US);
Brent Goetzl, Orinda, CA (US)

(73) Assignee: Radio Systems Corporation, Knoxville, TN (US)

( * ) Notice: Subject to any disclaimer, the term of this patent is extended or adjusted under 35 U.S.C. 154(b) by 143 days.

(21) Appl. No.: 13/206,217

(22) Filed: Aug. 9, 2011

(65) Prior Publication Data
US 2012/0182145 A1    Jul. 19, 2012

Related U.S. Application Data

(60) Provisional application No. 61/433,670, filed on Jan. 18, 2011.

(51) Int. Cl.
*G08B 1/00* (2006.01)
*A01K 11/00* (2006.01)

(52) U.S. Cl.
CPC .................................. *A01K 11/008* (2013.01)
USPC ................. 340/539.13; 340/539.1; 340/573.1

(58) Field of Classification Search
CPC ........... G08B 21/0269; G08B 21/0288; G08B 21/023; G08B 13/1427; G08B 21/0211; G08B 21/0263; G08B 21/028; G08B 21/0294; G08B 21/0258; G08B 21/0266; G08B 21/0277; G08B 21/02; G08B 21/0202
USPC ................. 340/539.1, 539.11, 539.13, 573.1, 340/573.2, 573.3
See application file for complete search history.

(56) References Cited

U.S. PATENT DOCUMENTS

| | | | | |
|---|---|---|---|---|
| 5,952,959 | A * | 9/1999 | Norris | 342/357.34 |
| 7,095,325 | B2 * | 8/2006 | McDonald et al. | 340/572.1 |
| 7,330,150 | B1 * | 2/2008 | Beason et al. | 342/357.34 |
| 7,602,302 | B2 * | 10/2009 | Hokuf et al. | 340/573.3 |
| 7,864,057 | B2 * | 1/2011 | Milnes et al. | 340/573.1 |
| 8,156,901 | B2 * | 4/2012 | Muelken | 119/720 |
| 2004/0162875 | A1 * | 8/2004 | Brown | 709/203 |
| 2005/0007251 | A1 * | 1/2005 | Crabtree et al. | 340/539.13 |
| 2005/0020279 | A1 * | 1/2005 | Markhovsky et al. | 455/456.1 |
| 2008/0036610 | A1 * | 2/2008 | Hokuf et al. | 340/573.3 |

(Continued)

OTHER PUBLICATIONS

Bruce E. Davis—Habitat Use, Movements, and Survival of Radio-Marked Female Mallards in the Lower Mississippi Alluvial Valley—Thesis, Dec. 2007, 78 pages, U.S.

(Continued)

*Primary Examiner* — Eric M Blount
(74) *Attorney, Agent, or Firm* — Pitts & Lake, P.C.

(57) ABSTRACT

Systems and methods of tracking an animal including a first device worn by an animal to acquire global positioning system (GPS) data corresponding to a location of the animal, and a second device carried by a user to receive the GPS data from the first device and to acquire GPS data corresponding to a location of the second device. The second device can include a compass element to provide a compass reading corresponding to an orientation of the second device, and a controller to calculate location and direction information of the first device relative to the second device, and a display unit to display a graphical representation indicating the location and direction of the first device relative to the second device.

22 Claims, 8 Drawing Sheets

(56) References Cited

U.S. PATENT DOCUMENTS

| | | | |
|---|---|---|---|
| 2008/0055155 A1* | 3/2008 | Hensley et al. | 340/539.13 |
| 2008/0061978 A1* | 3/2008 | Huang | 340/572.1 |
| 2008/0061990 A1* | 3/2008 | Milnes et al. | 340/573.1 |
| 2008/0129457 A1* | 6/2008 | Ritter et al. | 340/10.1 |
| 2008/0143516 A1 | 6/2008 | Mock et al. | |
| 2008/0252527 A1 | 10/2008 | Garcia | |
| 2009/0289785 A1* | 11/2009 | Leonard | 340/539.13 |
| 2010/0238022 A1* | 9/2010 | Au et al. | 340/539.13 |

OTHER PUBLICATIONS

Lepage et al.—Juvenile sturgeon (*Acipenser sturio*) habitat utilization in the Gironde estuary as determined by acoustic telemetry—Book excerpt, 8 pages, Canada, Jun. 2003.

Ecological Software Solutions, LLC—Location of a Signal software and user manual, http://www.ecostats.com/software/loas/loas.htm, 29 pages, U.S., Oct. 29, 2011.

* cited by examiner

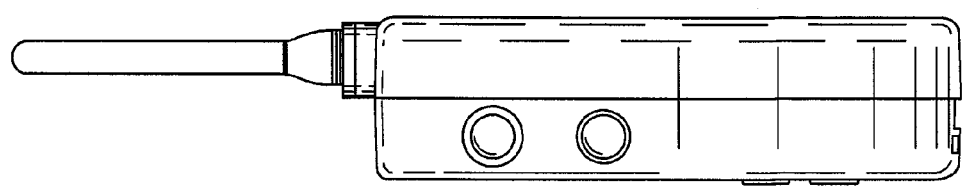
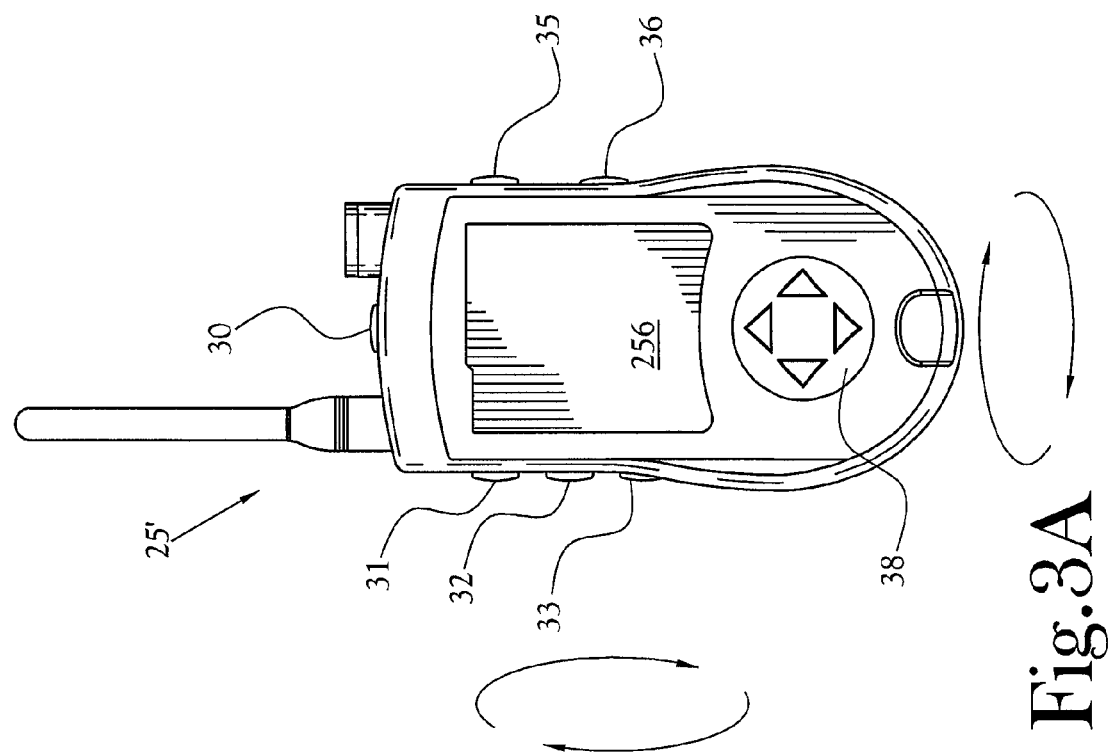
Fig.3B
Fig.3A

SYSTEMS AND METHODS TO TRACK MOVEMENT OF ANIMALS

CROSS-REFERENCE TO RELATED APPLICATIONS

This application claims priority from U.S. Provisional Application No. 61/433,670 filed on Jan. 18, 2011.

FIELD OF INVENTION

The present general inventive concept relates generally to systems and methods to track movement of animals, and more particularly, to a GPS enabled animal tracking device to calculate and display the location and direction of an animal relative to a user.

BACKGROUND

It is often desirable to track the location of animals for scientific, personal, or environmental reasons. In particular, pet owners, such as dog owners, are interested in tracking the location of their pets to ensure that they do not get lost or otherwise harmed. For example, hunting dogs are often equipped with tracking devices to locate the dogs in case the dogs become lost during hunting or training. Conventional dog location systems use various means for providing information related to the dog's location back to the user.

In basic dog tracking systems, the dog is typically equipped with a transmitter which periodically sends out a radio ping. The user is equipped with a radio receiver capable of picking-up this ping. In such systems, the receiver is designed so that the signal strength of the received radio signal is directly related to a sound generated by the user's receiver. A strong radio signal would produce a loud audible sound, and conversely, a weak radio signal would produce a faint sound. By determining the direction of the loudest sound, that same direction could be used to track the dog.

Later systems began to take advantage of Global Positioning System (GPS) technology. In these GPS animal tracking systems, the dog is equipped with a GPS receiver and a radio link back to the user. The GPS receiver provides the global longitude and latitude of the dog's location and the radio link transmits this data back to the user. The user would have a radio receiver to capture the data signal to provide the global location of the dog. This longitude and latitude data could then be transposed onto a topographical map which would provide the heading necessary to track the dog.

As these GPS animal tracking systems became more affordable and compact, modern GPS dog tracking systems began to incorporate a second GPS receiver in the user's radio receiver. This second GPS receiver enables the user to display the relative position and distance of the dog in relation to the user's current position. This information can be provided to the user in numeric form or in more intuitive graphical formats.

SUMMARY

Example embodiments of the present general inventive concept provide systems and methods of calculating and displaying the location and direction of an animal relative to a user.

Additional features and embodiments of the present general inventive concept will be set forth in part in the description which follows and, in part, will be obvious from the description, or may be learned by practice of the present general inventive concept.

Exemplary embodiments of the present general inventive concept can be achieved by providing an animal tracking system including a first device having a receiver to acquire global positioning system (GPS) data corresponding to the location of an animal, and a second device to receive the GPS data of the first device and to acquire GPS data corresponding to the location of the user, the second device including a controller to calculate location information of the animal and the user, and a display unit to display a graphical representation indicating the location of the animal relative to the user and a current direction of the animal relative to the user based on current calculated location information compared to previous calculated location information.

The graphical representation can include a direction arrow pointing in the direction of the animal relative to the user wherein a portion of the arrow represents the location of the animal, and can include a direction arrow corresponding to the location and direction of the animal relative to the user.

Exemplary embodiments of the present general inventive concept can also be achieved by providing a method of tracking an animal, including acquiring global positioning system (GPS) data corresponding to a first device worn by an animal to be tracked, transmitting the GPS data of the first device to a second device carried by a user, calculating location and direction information of the animal relative to the user using the GPS data of the first and second devices, and displaying a graphical representation indicating the location of the animal relative to the user and a current direction of the animal relative to the user on the second device.

The method can include obtaining a compass reading corresponding to an orientation of the second device, and adjusting the graphical representation based on the compass reading.

Exemplary embodiments of the present general inventive concept can also be achieved by providing an animal tracking system including a first device carried by an animal to receive global positioning system (GPS) information of the first device, the first device including a transmitter to transmit the GPS information, and a second device having a display unit carried by a user to receive GPS information of the second device and to receive the transmitted GPS information from the first device, wherein the second device calculates a direction vector of the animal based on a change of position between a recent data point of the transmitted GPS information and a prior data point of the transmitted GPS information, and displays a current direction and location of the animal relative to the user.

Exemplary embodiments of the present general inventive concept can also be achieved by providing an animal tracking system, including a first device carried by an animal to receive global positioning system (GPS) information of the first device, the first device including a transmitter to transmit the GPS information, and a second device carried by a user to receive GPS information of the second device and to receive the transmitted GPS information from the first device, the second GPS device having a display unit to display historical movement data points of the first device relative to the second device.

The historical movement data points can be displayed such that past data points are displayed in an incrementally subdued fashion relative to recent data points, and the historical movement data points can be selectively displayed based on predetermined time periods.

The second device can calculate a direction vector of the animal based on a change of position between a recent historical movement data point and a prior historical movement data point to display a graphical representation indicating a current direction of the animal relative to the user.

BRIEF DESCRIPTION OF THE DRAWINGS

The following example embodiments are representative of exemplary techniques and structures designed to carry out the objectives of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the exemplary embodiments, with reference to the accompanying drawings in which:

FIGS. 3A and 3B illustrate an exemplary handheld device for use in the exemplary animal tracking system of FIG. 2;

DETAILED DESCRIPTION

Reference will now be made to example embodiments of the present general inventive concept, examples of which are illustrated in the accompanying drawings and illustrations. The example embodiments are described herein in order to explain the present general inventive concept by referring to the figures.

Embodiments of the present general inventive concept can be implemented in connection with an animal tracking system using global positioning system (GPS) information to track the location and direction of one or more animals relative to a user, and to display the location and direction information to the user.

Figure 1:
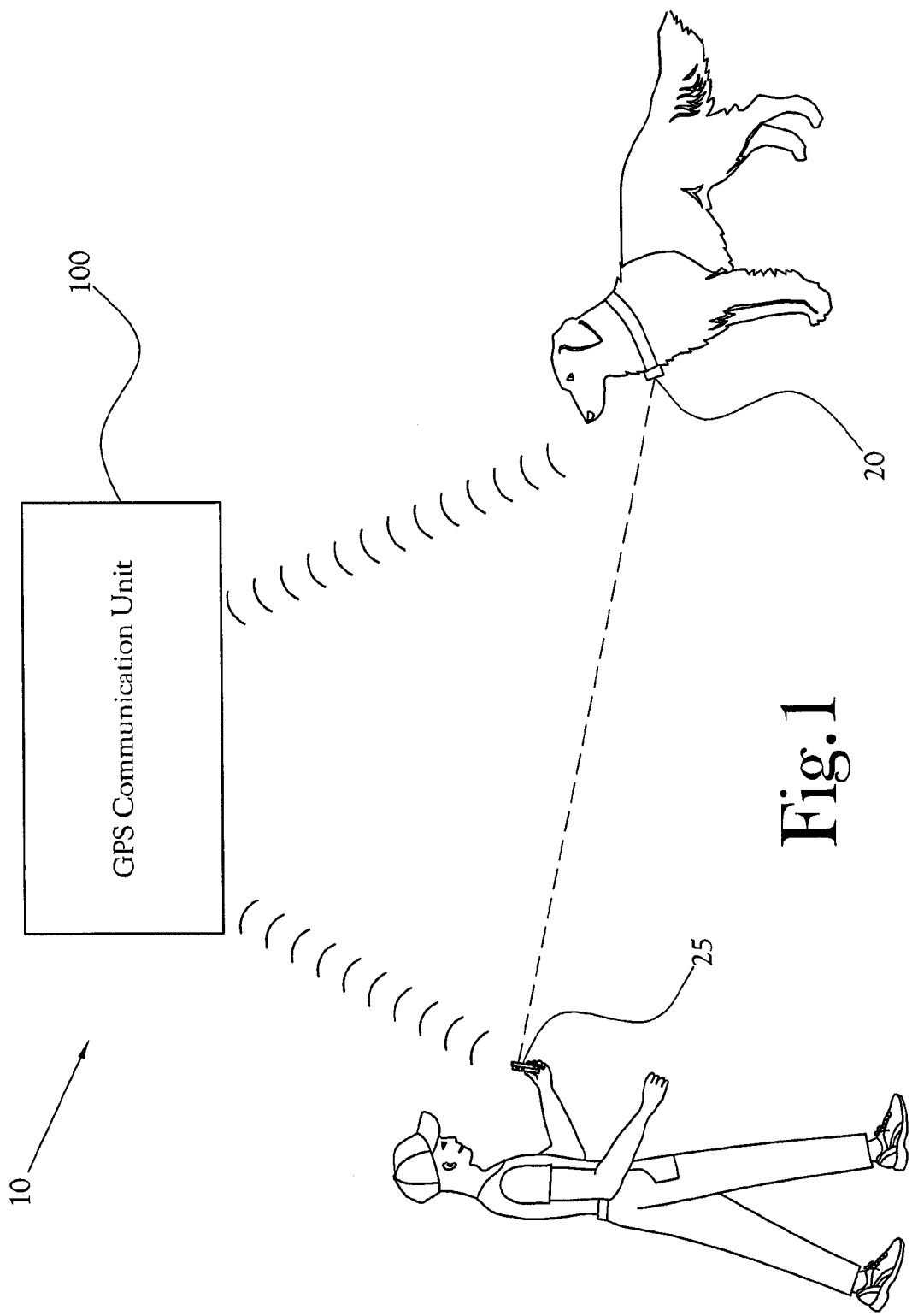
FIG. 1 illustrates a system environment in which exemplary features of the present general inventive concept may be implemented.

FIG. 1 illustrates a system environment in which exemplary features of the present general inventive concept may be implemented. Referring to FIG. 1, the exemplary GPS enabled animal tracking system 10 can include a first device 20, such as a GPS collar, to be carried by the animal, and a second device 25, such as a handheld device, to be carried by a user. The first device 20 and the second device 25 can communicate with a GPS communication unit 100, such as but not limited to GPS satellites, to acquire GPS data such as latitude, longitude, speed, and direction of the first and second devices 20, 25. It is possible for the first and second devices 20, 25 to communicate with a variety of known or later developed GPS communication devices, such as cell phone towers, repeater stations, or other types of communication systems capable of communicating GPS information. Thus, it is possible for the first and second devices 20, 25 to communicate with other types of GPS navigation equipment to receive GPS data, and is not limited to conventional communication protocols using GPS satellites.

The first and second devices 20, 25 can communicate with each other via a wired or wireless link to transmit the acquired GPS information and other control signals, such as animal stimulation signals. For example, the devices can utilize RF channels of the Multi-Use Radio Service (MURS) to facilitate communication between the handheld device and the corresponding collars. The second device 25 can receive GPS location information transmitted from the first GPS device, and can receive its own GPS information from the GPS communication unit 100, using known communication techniques and protocols.

Note that the terms first and second device are used herein merely to distinguish one device from the other, and in the illustrated embodiments, the first device 20 can take the form of a collar device worn by a dog, and the second device 25 can take the form of a handheld unit carried by a dog owner or trainer. However, the first device could be termed a second device, and the second device could be termed a first device, without changing the scope of the present general inventive concept. Moreover, the present general inventive concept is not limited to any particular configuration for the first and second GPS devices, or to any particular type of animal, and is not limited to any particular number of devices to be used. For example, it is possible for the exemplary animal tracking system to include any number of first and second device.

Spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 2:
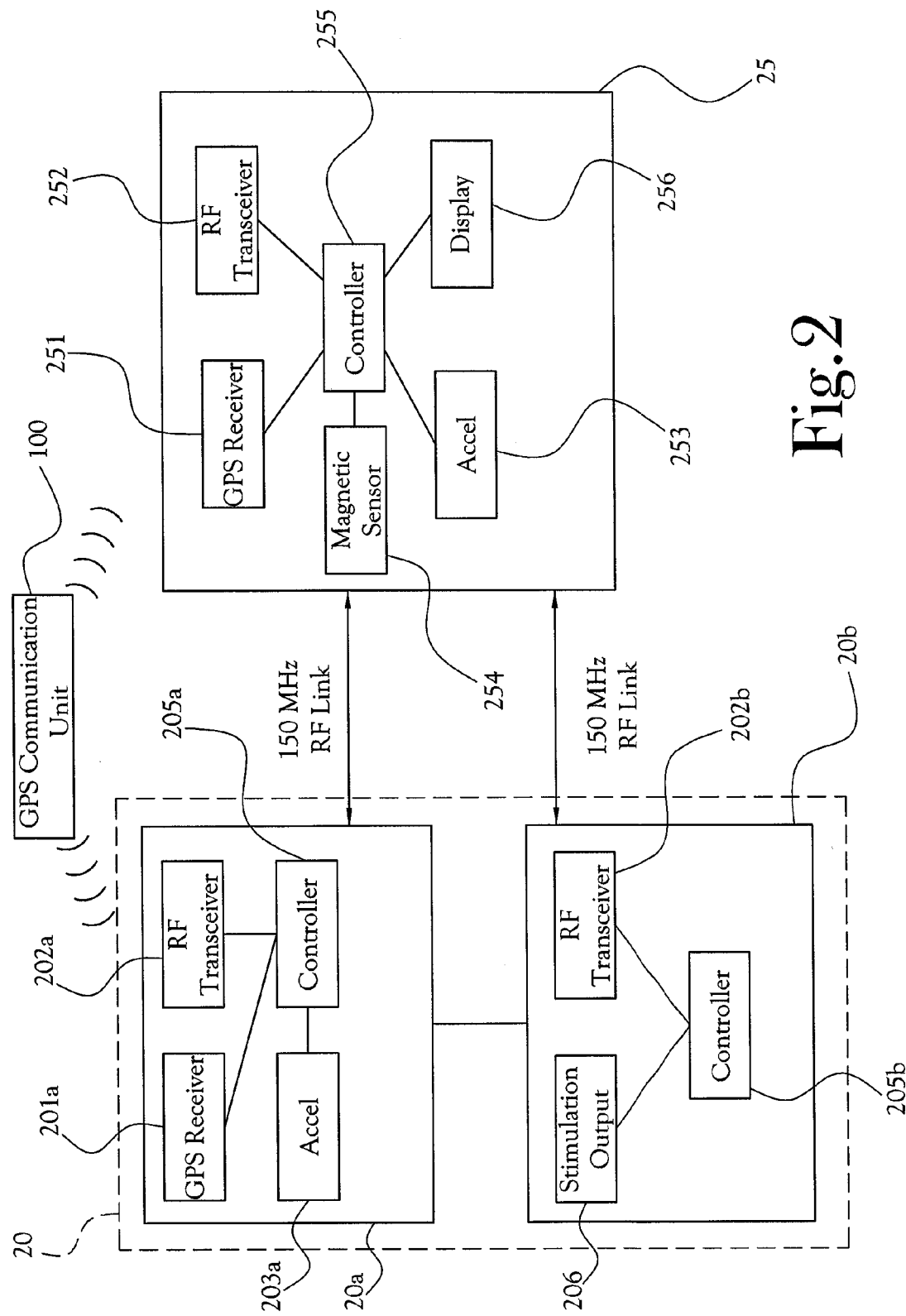
FIG. 2 illustrates a block diagram of an animal tracking system configured in accordance with an example embodiment of the present general inventive concept.

FIG. 2 illustrates a block diagram of an animal tracking system configured in accordance with an example embodiment of the present general inventive concept. Referring to FIG. 2, the first device 20 can include a GPS collar 20A including a GPS receiver 201A, RF transceiver 202A, accelerometer 203A, and controller 205A. The GPS receiver 201A can acquire GPS information from the GPS communication unit 100, and the first device 20 can communicate the GPS information to the second device 25 via an RF transceiver 202A. The accelerometer 203A can provide motion information relative to the first device 20. For example, the accelerometer 203A can provide a signal corresponding to particular movements of the animal, and the first device 20 can communicate the movement signal to the second device 25 via the RF transceiver 202A. Thus, the second device 25 can determine whether a hunting dog is moving (i.e., looking for or tracking the prey), stationary (i.e., frozen to indicate the presence of nearby prey; "on point") or vertical (i.e., to indicate the presence of nearby prey; "treed") based on the movement signal transmitted by the first device 20.

Referring to FIG. 2, the first device 20 can include a GPS collar unit 20A and an E-collar unit 20B, or can include only an GPS collar unit 20A. In some embodiments, the E-collar unit can include a stimulation output 206B to deliver a stimulation output to the animal based on a control signal from the second device 25. As illustrated in FIG. 2, it is possible to provide the stimulation output 206B in conjunction with a separate E-collar 20B, including a separate RF transceiver 202B and controller 205B. However, the present general inventive concept is not limited to any particular configuration of the first device 20, and it is possible for the first device 20 to include the GPS collar 20A and E-collar 20B as a single unit or as separate units. For example, it is possible for the first device 20 to include a GPS collar 20B with a stimulation output 206B integrated therein, or it is possible to provide a separate E-collar 20A device attachable to the GPS collar 20B to provide optional stimulation output 206B, without departing from the scope and spirit of the present general inventive concept.

Referring to FIGS. 2 to 3B, the second device 25 can be a handheld device 25' for use in the exemplary animal tracking system 10. The second device 25 can include a GPS receiver 251, RF transceiver 252, accelerometer 253, magnetic sensor 254, display 256, and controller 255. The GPS receiver 251 can acquire GPS information from the GPS communication unit 100, and the second device 25 can process the GPS information acquired from the GPS communication unit 100 and the first device 20 to determine location information of the first device 20 relative to the second device 25 using the controller 255. The second device 25 can transmit signals such as stimulation signals or other control signals to the first device 20 via the RF transceiver 252. In some embodiments, the accelerometer 253 and magnetic sensor 254 can be formed as parts of a 3-axis compass unit of the handheld device to provide 3-axis compass information for the second device 25, enabling the handheld device 25' to provide accurate information without having to hold the handheld device 25 at a particular angle to provide accurate direction of the animal. However, the present general inventive concept is not limited to a 3-axis compass unit, and a variety of other compass units could be provided, such as a 2-axis compass unit, without departing from the scope and spirit of the present general inventive concept.

The GPS information of the first and second devices 20, 25 can be processed by the controller 255 to enable the user to track and display the location, distance, and direction information of the animal and user.

Figure 4B:
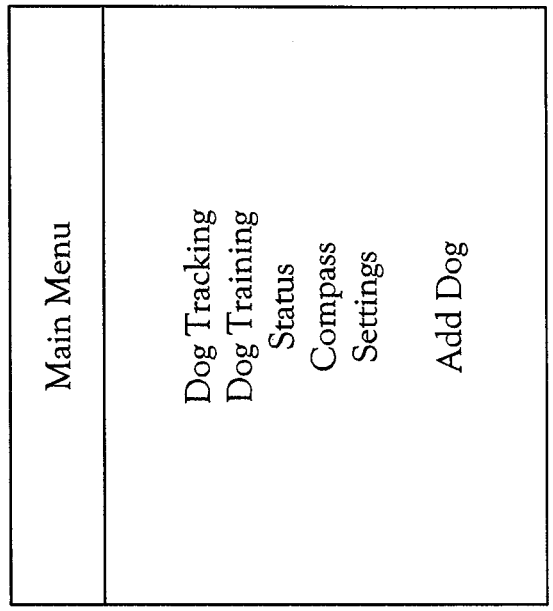
FIGS. 4A and 4B illustrate exemplary display screens of the handheld device according to an exemplary embodiment of the present general inventive concept.
Figure 4A:
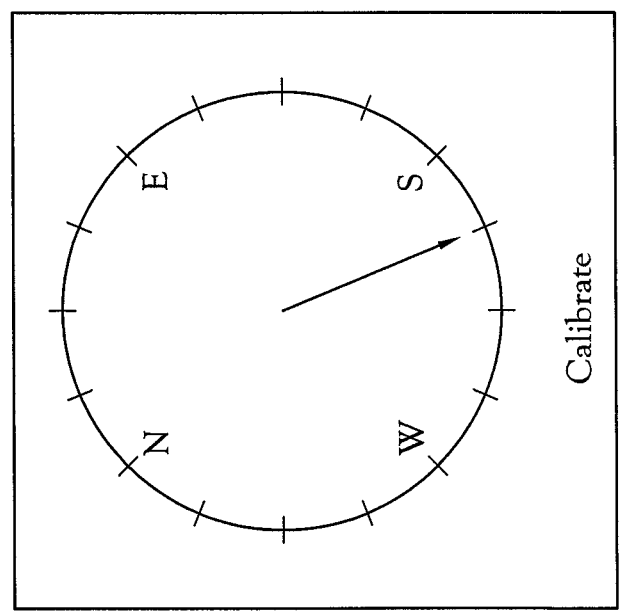

FIGS. 4A and 4B illustrate exemplary display screens of the handheld device according to an exemplary embodiment of the present general inventive concept.

Referring to FIGS. 3A to 4A, the 3-axis compass unit can be calibrated by rotating the handheld device 25 in each axis as indicated by the rotating direction arrows of FIGS. 3A and 3B to orient the handheld device for use. As illustrated in FIG. 4A, the display screen of the handheld device 25' can display a compass reading corresponding to the orientation of the handheld device calibrated using the accelerometer 253 and magnetic sensor 254. For example, in some embodiments, it is possible to calibrate the compass by rotating the handheld device 25' in three dimensions. A visual, audio, vibration, or other type of representation indicating that the compass unit has been successfully calibrated can be provided by the handheld device 25', but the present general inventive concept is not limited thereto.

The first and second devices 20, 25 can both include an integrated or removable antenna member to communicate with GPS satellites to determine the exact location of the GPS devices and to communicate with one another. The devices can utilize RF channels of the Multi-Use Radio Service (MURS) to facilitate communication between the handheld device and the corresponding collars. In some embodiments, the display unit 256 of the second device 25 can allow the user to view historical data points, or paths, traveled for both the dog and the user and to view the distance traveled for any path, including a compass screen to provide navigation and calibration functions.

The techniques and devices of the present general inventive concept can be implemented to selectively display a graphical indication to the user representing the current location, past movement and/or current direction of the animal relative to the user. The GPS information can be transmitted and displayed between the devices to enable the user to view current position of the first device relative to the second device and the direction the animal is heading, as well as enabling the user to selectively view one or more historical paths that the dog and/or user have taken relative to one another.

Referring back to FIGS. 3A and 3B, the handheld device 25' can include one or more user interface controls to select various functions to be used for each dog. For example, the handheld device 25' can include user defined stimulation buttons 31, 32, 33 to selectively transmit various stimulation control signals to the first device 20, such as continuous stimulation, vibration, tone, or other types of stimulation signals, in addition to a power button 30, menu button 35, tracking/training toggle button 36, and menu navigation/selection button 38, to navigate and control the various display screens and system features. In some embodiments, the stimulation buttons 31, 32, and 33 can be selectively assigned to correspond to different animals being tracked.

In some embodiments, the movement and location information of the first device can be transmitted to the second device at predetermined refresh rates (such as 5 s, 10 s, 15 s, etc.) in order to track the most recent movements of the animal, but is not limited thereto. This enables the user to remotely monitor movements of the animal "on the fly" by tracking the most current GPS information transmitted between the devices. For example, the first device 20 can be configured to only keep the most recently calculated location received from the GPS satellites, and is not required to log or otherwise maintain a historical record of previously calculated collar locations once they are transmitted to the second device 25.

Using a 3-axis compass unit and the GPS data, the second device 25 can calculate the angle between a line connecting the first and second devices and a predetermined north-south line, east-west line, or meridian. This bearing can be used to determine the position and direction of the first device 20 with respect to the handheld device 25.

FIGS. 5 to 8 illustrate various displays and graphical heading indicators configured in accordance with example embodiments of the present general inventive concept.

Referring to FIGS. 5 to 8, the exemplary display screens provided by the handheld device 25 include tracking information for three different dogs, as generally represented by the display icons corresponding to the current direction and location of the animal and/or past locations and directions of the animal. In the example embodiments, the animals being tracked are referred to in some of the figures as Ripley, Talon, and Lulu, respectively. Note that the present general inventive concept is not limited to any particular number of tracked animals. Moreover, although the exemplary embodiments of FIGS. 5-8 illustrate various different dogs being tracked, the present general inventive concept is not limited to any particular number or type of animal.

Figure 5:
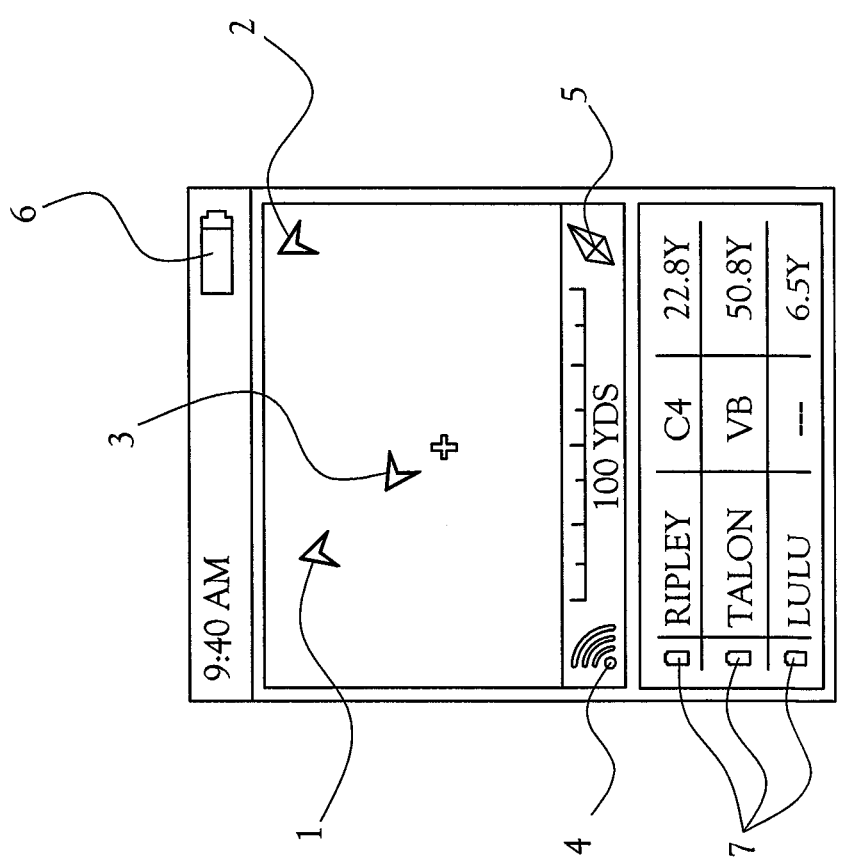
FIG. 5 illustrates an exemplary display screen generated by the handheld device according to an exemplary embodiment of the present general inventive concept.

FIG. 5 illustrates an exemplary display screen generated by the handheld device according to an exemplary embodiment of the present general inventive concept. Referring to FIG. 5, the three different direction indicator arrows correspond to the current location and direction, or heading, of the respective animals relative to the user's position. The cross-hair in the middle of the screen can be used to represent the current location of the user, although the present general inventive concept is not limited to any particular type of graphical indicators, or icons, to represent the animal and user. For example, the graphical representations of the animals could take the form of an animal-shaped icon. In some embodiments, the head of the animal could be used to indicate the current direction of the animal, and the body of the animal could be used to indicate the current location of the animal based on the current scale of the display screen. The icons can indicate whether the dog is running, on point, treed, stationary, barking, and the like, and the movement of the user.

Although the user's location is represented in the illustrated embodiments as a cross-hair, it is possible to display the location and heading of the user using any number of icons, such as a human figure, arrow, circle, or other icon. The orientation of the direction arrow (e.g., up, down, left right, etc.) can represent the current heading or direction of the animal and user relative to one another, and the icons can be color coded so the user knows which icon corresponds to each dog by the color of the icon matching the color of the text.

The display can include an incremented scale to provide a visual representation of the actual distance between the user and the respective animals, and can display the actual calculated distances from the user for each animal. The user has the option to keep the scale at a fixed distance (e.g., 100 yards), or the user can select Auto where the scale will automatically adjust in real time once the animal goes outside the scale. The unit can periodically check to see if any of the animals are outside the scale and can zoom to a level where all the animals are visible on the screen. If the animal is lost or off-screen, a graphical indicator, such as an outline of the icon or a blinking icon representing the animal can be provided to the user, or a separate tab can be provided showing the animal's location in relation to the scaled display.

Referring to FIG. 5, Ripley is represented as 1, Talon as 2, and Lulu as 3. As indicated in FIG. 5, Ripley 1 is shown located 22.8 yards from the user and provided with continuous stimulation C4; Talon 2 is shown located 50.8 yards from the user and provided with vibration stimulation VB; and Lulu is shown located 6.5 yards from the user with no stimulation provided. The stimulation buttons 31, 32, 33 (FIG. 3A) of the handheld device 25' can be selectively assigned to each dog, respectively. The display can include a GPS fix indicator 4, compass indicator 5, and battery indicator 6. The display can also include separate battery level indicators 7 corresponding to the battery level of the individual GPS units 20A, respectively. In some embodiments, the GPS fix indicator 4 can indicate whether the handheld device has achieved a 'fix' on the animals as determined by a GPS engine of the controller(s). The compass indicator 5 can indicate the current orientation of the handheld device as determined by the compass unit.

Figure 6:
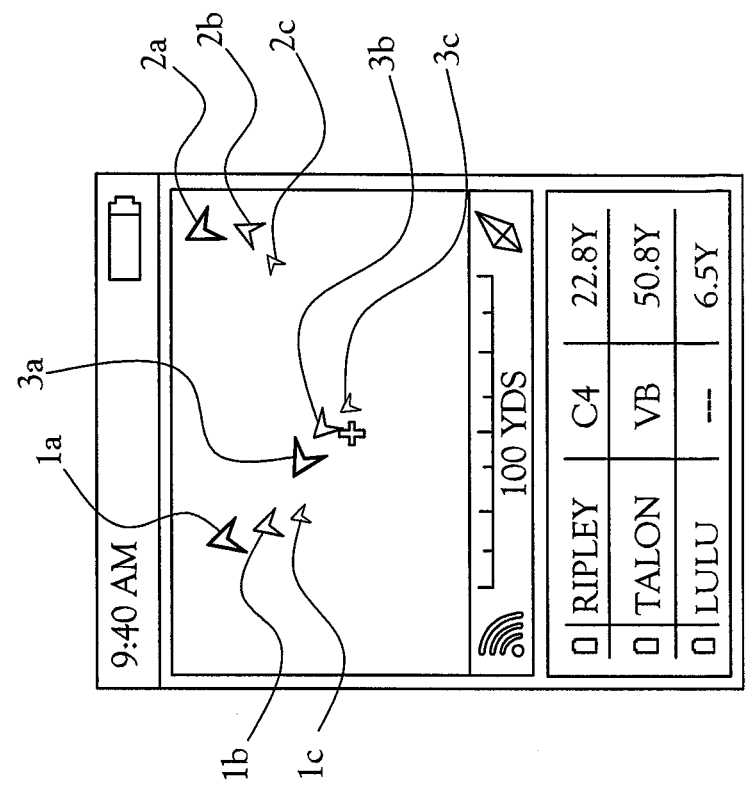
FIG. 6 illustrates an exemplary display screen generated by the handheld device according to another example embodiment of the present general inventive concept.

FIG. 6 illustrates an exemplary display screen generated by the handheld device according to another example embodiment of the present general inventive concept. In FIG. 6, similar to FIG. 5, the three large direction indicator arrows correspond to the current location and direction of the animals relative to the user's position. However, FIG. 6 includes a plurality of additional and smaller indicator arrows 1a, 1b, 1c; 2a, 2b, 2c; 3a, 3b, 3c, corresponding to a plurality of historical data points relative to each animal's movement. These additional data points are represented in the form of smaller (i.e., subdued) arrows, although any other shape, number, and/or size of icons could be used. In FIG. 6, the smaller historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping as well as current location and direction information of the animal's movement relative to the user.

Figure 7:
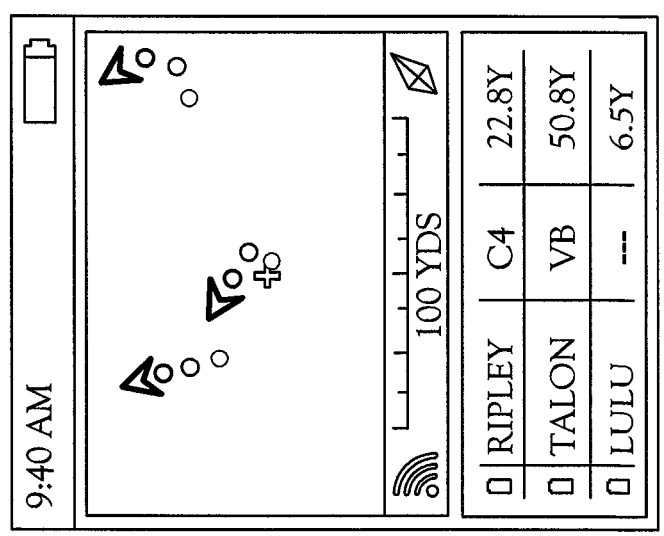
FIG. 7 illustrates an exemplary display screen generated by the handheld device according to another example embodiment of the present general inventive concept.

FIG. 7 illustrates an exemplary display screen generated by the handheld device according to another example embodiment of the present general inventive concept. In FIG. 7, similar to FIGS. 5 and 6, the three large direction indicator arrows correspond to the current location and direction of the animals relative to the user's position. However, FIG. 7 includes a plurality of circles corresponding to historical data points relative to the animal's movement. Although these additional data points are represented in the form of circles, any other shape, size, and number of icons could be used. In FIG. 7, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, similar to the embodiment of FIG. 6, the movement and data points transmitted by the first device can be received and displayed by the second device to provide a historical mapping as well as current location and direction information of the animal's movement relative to the user.

Figure 8:
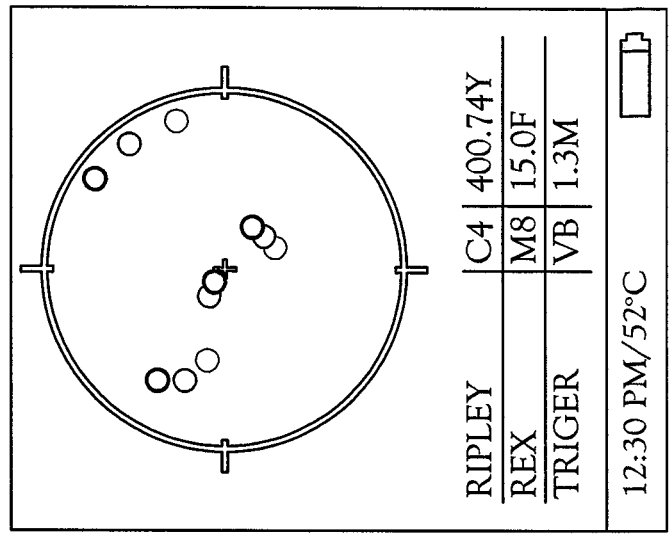
FIG. 8 illustrates an exemplary display screen generated by the handheld device according to another example embodiment of the present general inventive concept.

FIG. 8 illustrates an exemplary display screen generated by the handheld device according to another example embodiment of the present general inventive concept. FIG. 8 includes a plurality of circles corresponding to historical data points relative to the animal's movement, but does not include the three large indicator arrows. These historical data points are represented in the form of circles, although any other shape, size, and number could be used. In FIG. 8, similar to FIG. 7, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping of the animal's movement relative to the user, with the most recent circle also providing the current location of the first device.

In the example embodiments, the change of position between the most recent data point and the prior data point can be used to provide a directional vector, or indicator, indicating the dog's recent movement. This vector information can be used to graphically display the dog's current heading in relation to the user. In the example embodiments, the dog's current heading can be indicated by an arrow while the historical location data points are displayed as dots or circles, although it is possible that any other shape or number of data points could be used without departing from the broader scope and teachings of the present general inventive concept.

The user can select to display a complete history of the paths taken by the respective animals, a partial history, or no history at all. The historical paths can take the form of a series of icons, historical data points, or a continuous path line or bread-crumb trail to show the path of the animal over time. For example, if the screen becomes cluttered with numerous paths, the user can selectively choose the length of paths shown, or no paths shown. The handheld can be programmed to automatically refresh the display screen at predetermined intervals or lengths of trails to maintain a fresh looking display.

Figure 9:
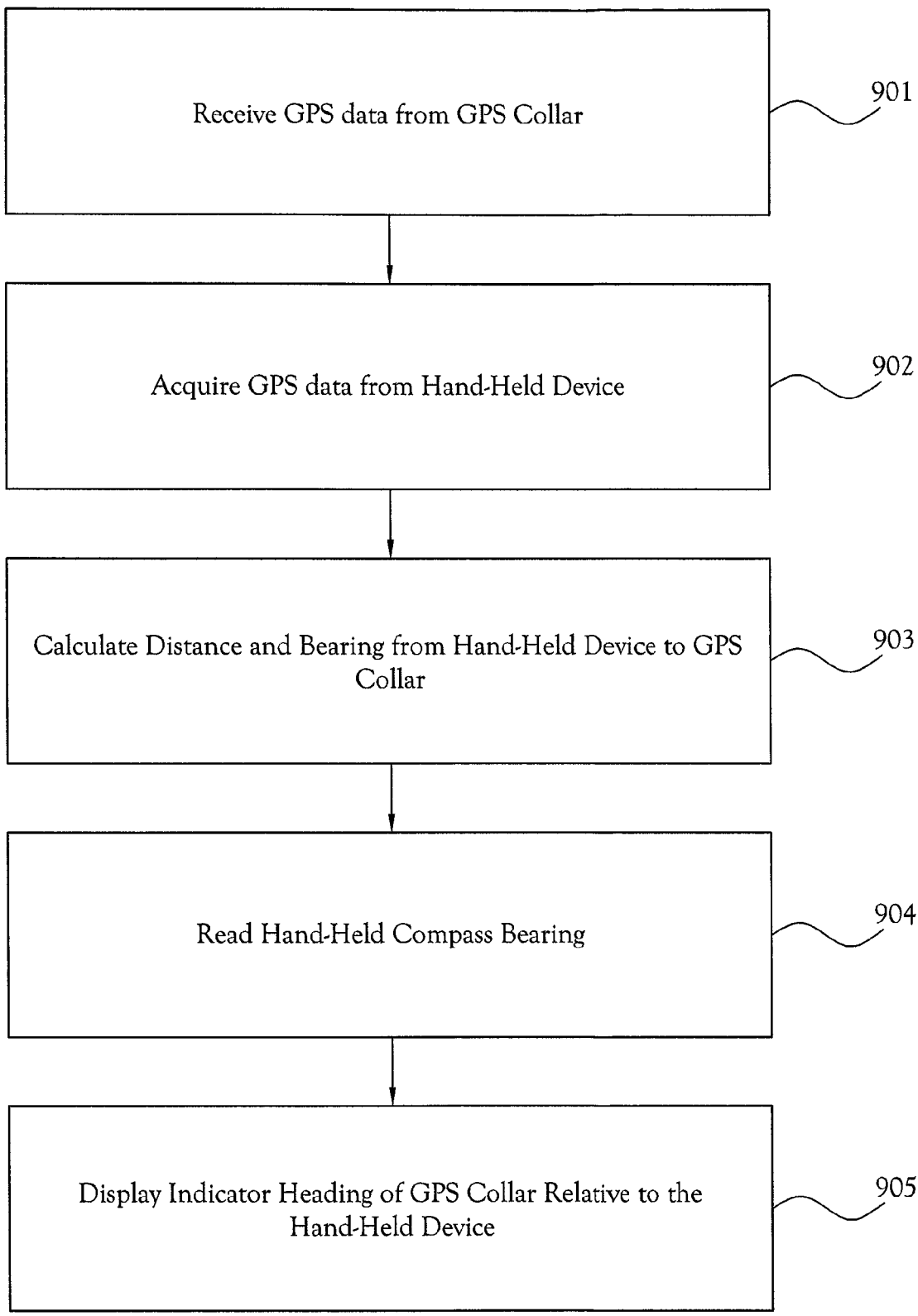
FIG. 9 is a flow chart illustrating an exemplary routine performed by circuitry programmed to display the location and direction of an animal according to an exemplary embodiment of the present general inventive concept.

FIG. 9 is a flow chart illustrating an exemplary routine performed by circuitry programmed to display the location and direction of an animal according to an exemplary embodiment of the present general inventive concept. In operation 901, the handheld device can receive GPS data, such as latitude, longitude, speed, and direction, from the GPS collar. In operation 902, the handheld acquires its local GPS data. In operation 903, the handheld calculates the distance and bearing from the handheld device to the GPS collar worn by the animal using the GPS information of the handheld and the GPS collar. In operation 904, the handheld reads its compass bearing. In operation 905, the handheld displays a graphical representation indicating the heading and location of the GPS collar relative to the handheld device.

Figure 10:
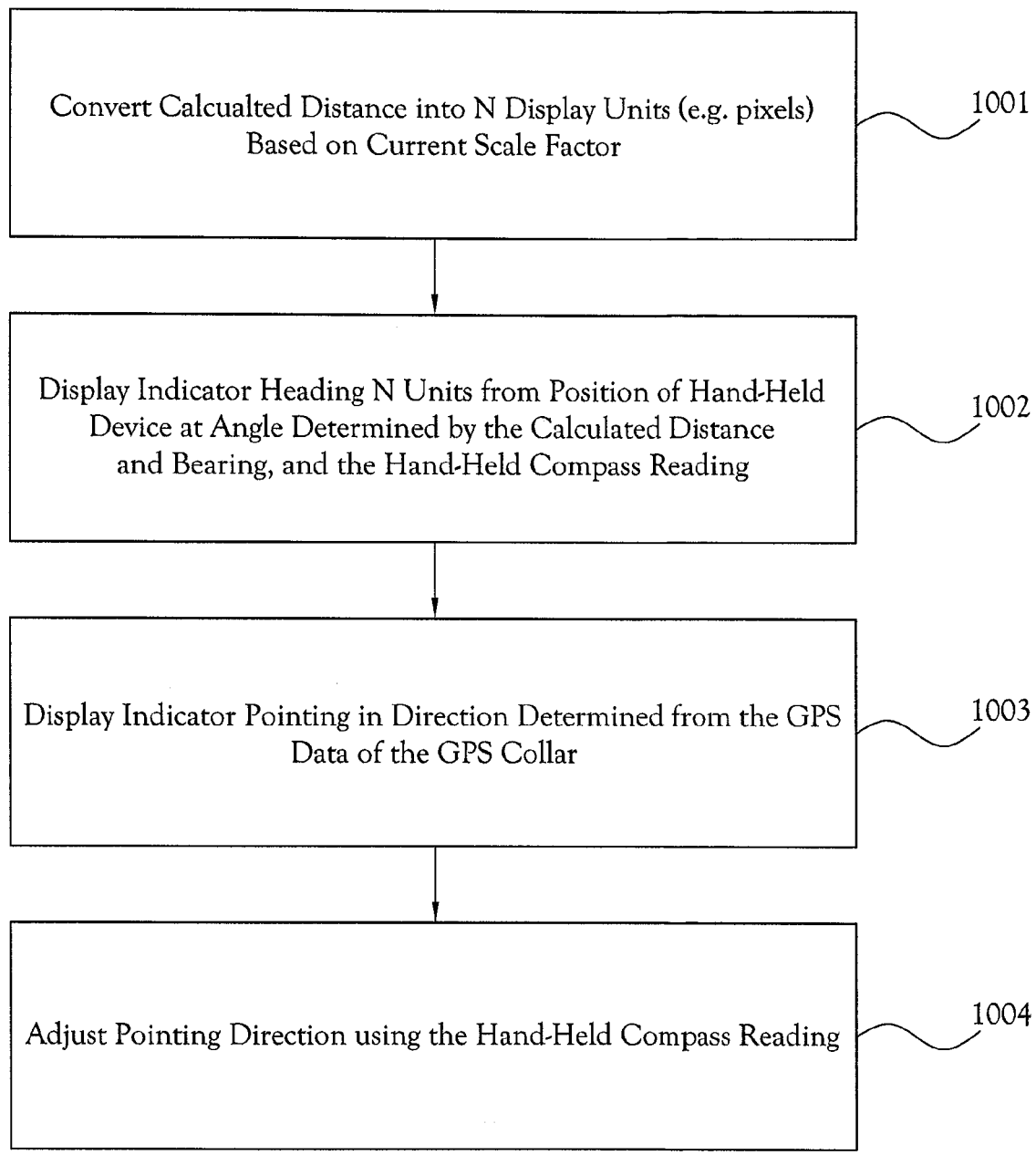
FIG. 10 is a flow chart illustrating an exemplary routine performed by circuitry programmed to display the direction of an animal according to an exemplary embodiment of the present general inventive concept.

FIG. 10 is a flow chart illustrating an exemplary routine performed by circuitry programmed to display the direction of an animal relative to a user according to an exemplary embodiment of the present general inventive concept. In operation 1001, the distance calculated in operation 903 is converted into N display units (e.g., pixels) based on the current scale factor of the display screen. In operation 1002, the icon representing the animal is displayed N units from the icon representing the user and is located at an angle determined by the calculated bearing based on the handheld compass reading. For example, the center of the arrow indicating an animal is located N units from the handheld position on the display screen at the angle determined by the calculated distance and bearing of operation 903 and the compass reading of operation 904. In operation 1003, the icon representing the animal is displayed pointing in the direction determined from comparing a current operation 905 to a previous operation 905. For example, the direction of the animal can be determined by calculating a direction vector between a recent position of the animal and a prior position of the animal. In operation 1004, the direction of the animal can be adjusted by the compass reading of operation 904.

As described and illustrated herein, the example embodiments of the present general inventive concept can provide an animal tracking system and/or graphical heading indicator which greatly adds to the value of dog tracking data sent back to the user by including information related to the dog's historical movement and/or current direction and location. The present general inventive concept can provide a graphical representation of a plurality of historical data points relative to the dog's movement. The plurality of past data points can provide a historical mapping of the dog's movement, and the most recent data point can provide the relative position of the dog in relation to the user. Furthermore, the change of position between the most recent data point and the prior data point can provide a directional vector indicating the dog's most recent movement. This vector information can be used to graphically display the dog's current heading in relation to the user.

Still other embodiments will become readily apparent to those skilled in this art from reading the above-recited detailed description in view of all the drawings and figures. For example, it is possible to provide a simplified display having a single arrow to graphically indicate the position of the dog relative to the user as well as the dog's current direction. Here, as in the other example embodiments, the direction of the arrow can be determined by calculating the direction vector between the dog's present position and the dog's prior position.

In other embodiments, the dog's current position as well as data from historical positions could be represented by multiple icons. Each icon could represent a position in time with the most recent position having the most vividly displayed icon, and the oldest icon the least visual strength. The changing relative position of the multiple icons can thus provide a graphical representation of movement and current heading.

The present general inventive concept can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein. For example, it is possible to display historical movement and current location and direction information of the user in addition to historical movement and location and direction information of the animal.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. An animal tracking system, comprising:
    a first device including a receiver to acquire global positioning system (GPS) data corresponding to one or more animals; and
    a second device to receive the GPS data of the first device and to acquire GPS data corresponding to a user, the second device including a controller configured to calculate location information of both an animal and the user, and a display unit configured to display a graphical representation indicating the historical location points of both the user and the animal and a current direction of movement of the animal relative to the user based on the calculated location information.

2. The animal tracking system of claim 1, wherein the graphical representation includes a direction arrow pointing in the direction an animal is heading relative to the user wherein at least a portion of the arrow represents the location of the animal.

3. The animal tracking system of claim 1, wherein the second device includes a compass unit to orient the second device with respect to the GPS data of the first and second devices.

4. The animal tracking system of claim 1, wherein the historical location points comprise a plurality of direction arrows.

5. The animal tracking system of claim 4, wherein the plurality of direction arrows are displayed such that a previous direction arrow is displayed in an incrementally subdued fashion with respect to a more recent direction arrow.

6. The animal tracking system of claim 1, wherein the graphical representation includes a GPS lock indicator to indicate whether the first device has lost communication with a GPS satellite or the second device.

7. The animal tracking system of claim 2, wherein the direction arrow takes the form of a hollow arrow when the first device loses communication with a GPS communication unit or the second device.

8. The animal tracking system of claim 3, wherein the compass element is a 3-axis compass element.

9. The animal tracking system of claim 8, wherein the controller adjusts the orientation of the direction arrow based on a reading of the compass unit.

10. The animal tracking system of claim 1, wherein the first device includes a stimulation device to deliver a stimulation output to the animal in response to a stimulation signal transmitted from the second device.

11. A method of tracking an animal, comprising:
    acquiring global positioning system (GPS) data corresponding to a location of a first device worn by an animal;
    acquiring GPS data corresponding to a location of a second device carried by a user;
    transmitting the GPS data of the first device to the second device;
    calculating location information of the animal relative to the user using the GPS data of the first and second devices; and
    displaying a graphical representation indicating the location of the animal relative to the user and a current direction of movement of the animal relative to the user on the second device based on the calculated location information;
    wherein the display is configured to display an incremented scale that automatically adjusts in real time if the animal goes outside the incremented scale and zooms to a level where the graphical representation is visible on the display.

12. The method of claim 11, wherein the current direction of the animal is calculated based on current calculated location information of the animal compared to previous calculated location information of the animal.

13. The method of claim 11, further comprising:
    obtaining a compass reading corresponding to an orientation of the second device; and
    adjusting the graphical representation based on the compass reading.

14. An animal tracking system, comprising:
    a first device carried by an animal including a GPS receiver to receive global positioning system (GPS) information of the first device, the first device including a transmitter to transmit the GPS information; and
    a second device carried by a user including another GPS receiver to receive GPS information of the second device and to receive the transmitted GPS information from the first device, the second device including a controller to calculate a direction indication of the animal based on a change of position between a recent location point of the transmitted GPS information and a prior location point of the transmitted GPS information, and a display unit to display a current direction of movement and location of the animal relative to the user based on the direction indication;
    wherein the display is configured to display an incremented scale that automatically adjusts in real time if the animal goes outside the incremented scale and zooms to a level where the graphical representation is visible on the display.

15. An animal tracking system, comprising:
    a first device carried by an animal to receive global positioning system (GPS) information of the first device, the first device including a transmitter to transmit the GPS information; and
    a second device carried by a user to receive GPS information of the second device and to receive the transmitted GPS information from the first device, the second GPS device having a display unit configured to display historical location points traveled of both the first and second device.

16. The animal tracking system of claim 15, wherein the historical location points are displayed such that past location points are displayed in an incrementally subdued fashion relative to recent location points.

17. The animal tracking system of claim 15, wherein the historical location points are selectively displayed based on predetermined time periods.

18. The animal tracking system of claim 15, wherein the second device calculates a direction indication of the animal based on a change of position between a recent historical location point and a prior historical location point to display a graphical representation indicating a current direction of the animal relative to the user.

19. The animal tracking system of claim 11, wherein the second device periodically checks to see if an animal is outside the scale zooms to a level where all animal(s) are visible on the screen.

20. The animal tracking system of claim 3, wherein the second device provides a representation to the user indicating when the compass unit has been successfully calibrated.

21. The animal tracking system of claim 10, wherein the second device comprises stimulation buttons selectively assigned to correspond to different animals being tracked to selectively stimulate different animals.

22. The animal tracking system of claim 11, wherein calculated distance is converted into N display units based on a current scale factor of the display.

* * * * *